FIG. 8
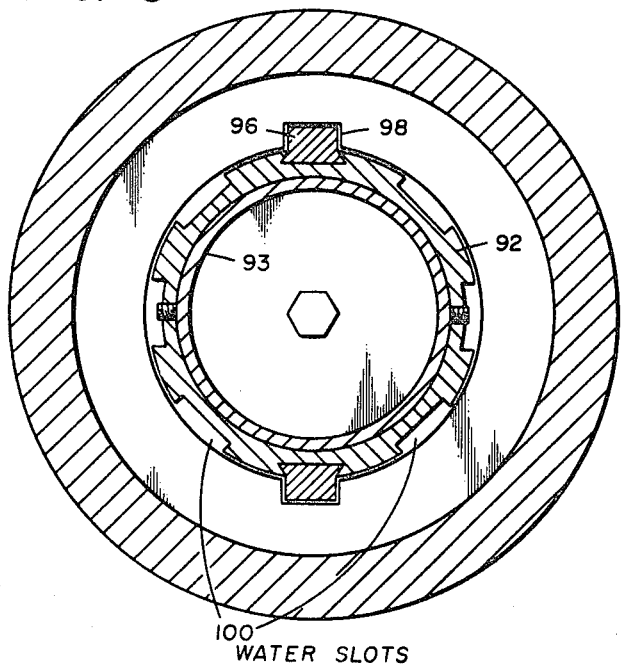
FIG. 9
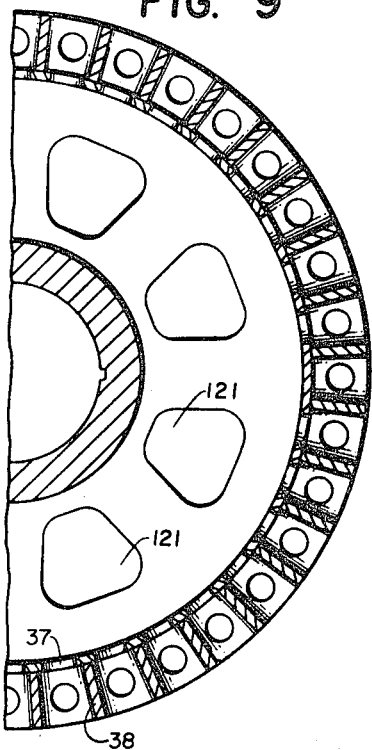
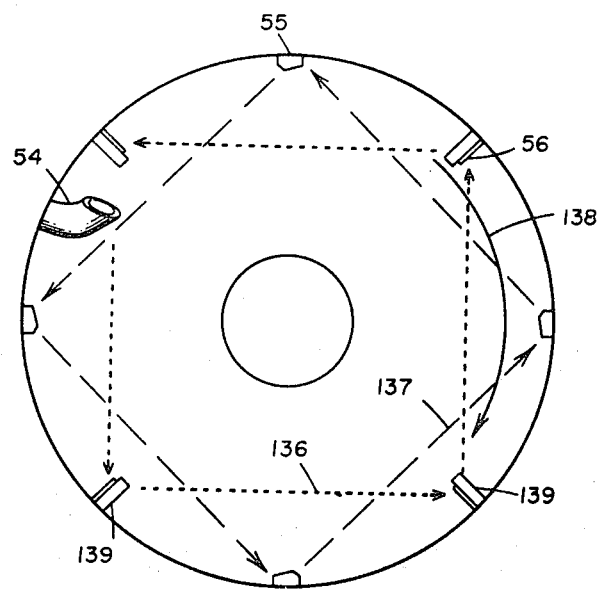
FIG. 10

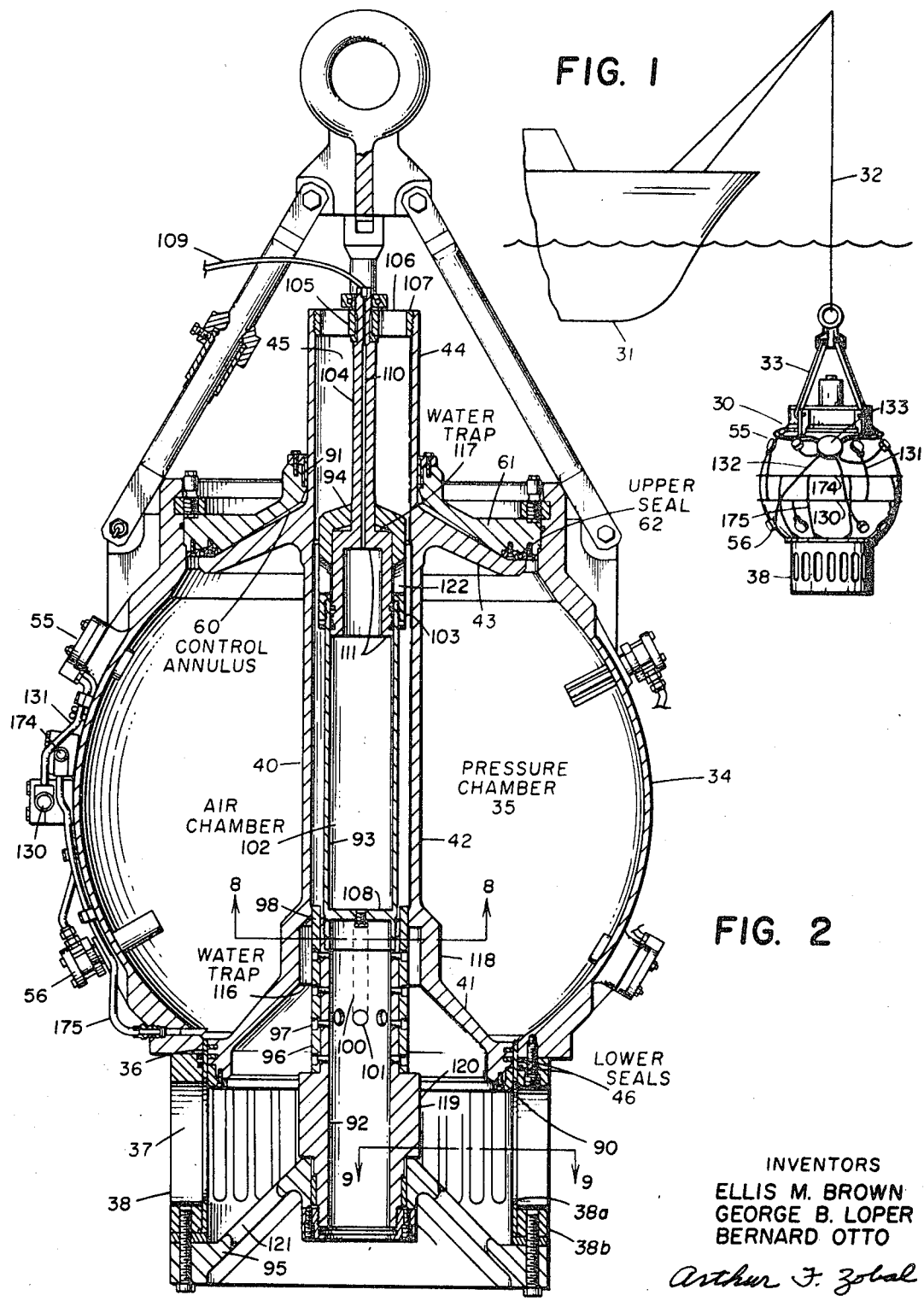

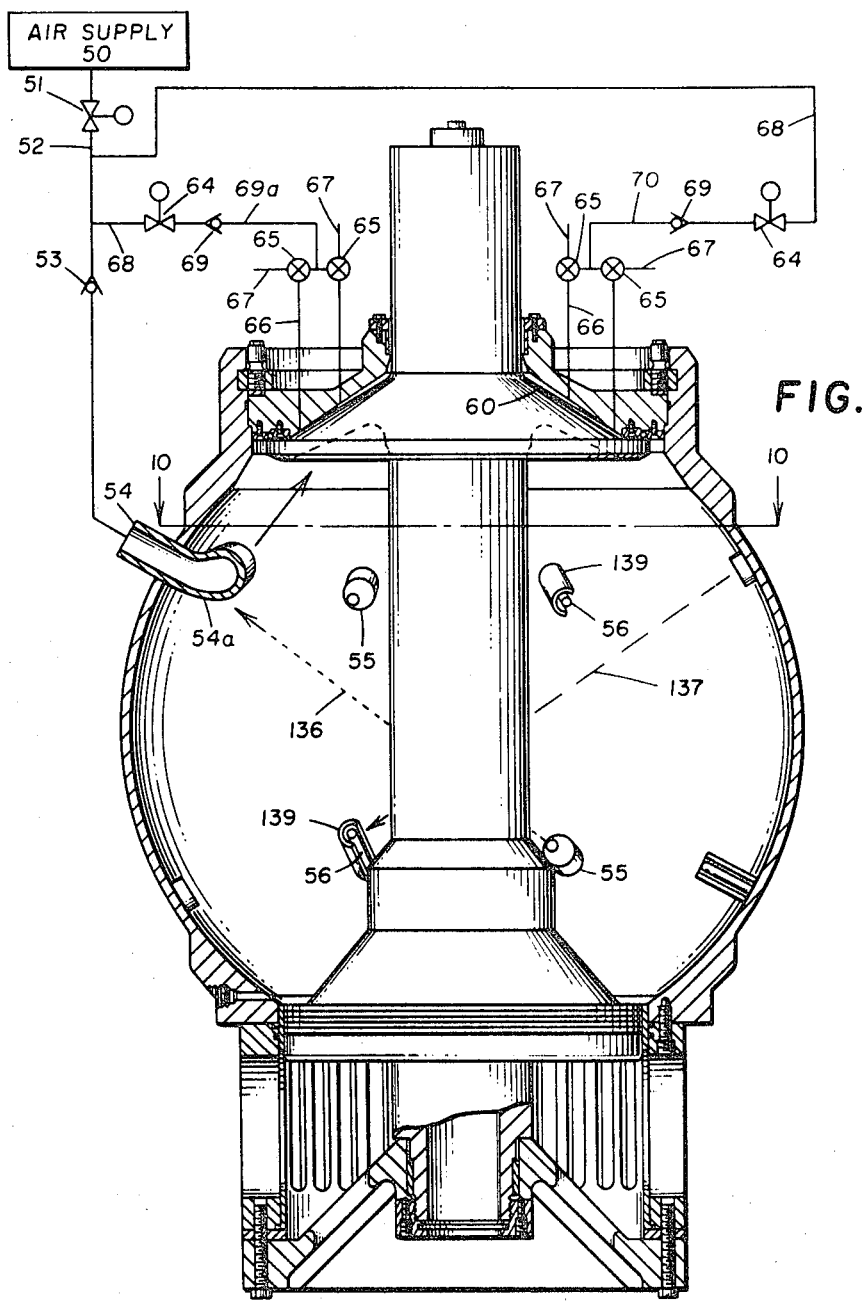

INVENTORS
ELLIS M. BROWN
GEORGE B. LOPER
BERNARD OTTO

Arthur F. Zobal
ATTORNEY

United States Patent Office 3,468,396
Patented Sept. 23, 1969

3,468,396
SEAL FOR PNEUMATIC ACOUSTIC SOURCE
Ellis M. Brown, Dallas, George B. Loper, Duncanville, and Bernard Otto, Arlington, Tex., assignors to Mobil Oil Corporation, a corporation of New York
Filed Aug. 28, 1967, Ser. No. 663,664
Int. Cl. G10k 11/00
U.S. Cl. 181—.5                   13 Claims

ABSTRACT OF THE DISCLOSURE

The specification discloses cooeparting elastomer and metal seal rings in a pneumatic acoustic source which are used in the control of a quick-acting valve employed to release pressurized gas from a chamber to generate an acoustic pulse in water. The metal ring is supported to contact the valve to form a control region when the valve is closed. The chamber may be pressurized by igniting combustible fluid injected therein. The elastomer ring is protected from heat by the metal ring and by way of cooling channels formed in the chamber structure for cooling the pressurized gas from the chamber before it is applied to one side of the elastomer ring for pressure sealing purposes.

Background of the invention

This invention relates to a novel seal used in a marine pneumatic acoustic source for controlling a quick-acting valve employed to release pressurized gas from a chamber to generate an acoustic pulse.

In the United States patent application Serial No. 534,130, filed March 14, 1966, by George B. Loper, now Patent No. 3,397,755 and assigned to the same assignee as that of the present invention, there is disclosed a repetitive pneumatic acoustic source for marine seismic operations and which comprises a rigid chamber having an outlet port which is opened and closed by a fast-acting, spool-shaped valve. In operation, the valve is moved to close the port and the chamber is pressurized with high gas pressure. The valve is then actuated to open the port to allow the pressurized gas to be released rapidly into the water to generate an acoustic pulse. The cycle is repeated periodically to generate repetitive acoustic pulses in water.

The spool-shaped valve has a port release rim which is employed for opening and closing the outlet port and a control rim which is employed for control purposes. The control rim is supported for movement within the chamber of the source. In the closed position of the valve, the control rim cooperates with a seal to form a control region sealed from the high gas pressure in the main chamber. Actuation of the valve is accomplished by increasing the pressure in the control region to move the valve to a position to disengage the seal. At this point, high gas pressure in the main chamber acts on both sides of the control rim to nullify the forces on this rim thereby putting a net force on the release rim to move the valve rapidly to an open position to release the high gas pressure into the water for generating an acoustic pulse.

In one embodiment, the chamber is pressurized by injecting compressed air and diesel fuel therein to form a combustible mixture which is ignited to form hot gases of high pressure.

In the development of the acoustic source, it was desired to employ an upper contact seal rather than a sliding seal for forming the control region since less time is required to move the quick-acting valve to a position to disengage a contact seal to expose the control region following a trigger command. Problems arose, however, in developing a suitable contact seal. For example, in the source employing diesel fuel, an elastomer seal alone, supported to contact the control rim, tended to erode and had a very limited life. This was due to the high temperature and velocity of the pressurized gas formed within the pressure chamber and which flows past the seal when it is disengaged upon actuation of the valve. This temperature was determined to be around 1700° F. or above. It was found that a commercially available O-ring seal, of a heat resistant elastomer, when employed in the source unprotected and directly exposed to such temperatures would burn out after a few cycles of operation of the source. Moreover, such an O-ring tended to blow out of its confining slot.

In accordance with the present invention, the problem was solved by providing a rubber-like or elastomer seal cooperating with a metal seal, the latter of which directly contacts the upper surface of the control rim when the valve is in its closed position. Both the elastomer seal ring and the metal seal ring are supported and confined in a slot formed in the chamber wall structure surrounding the upper surface of the control rim. The elastomer O-ring is positioned to contact the walls of the slot and to apply pressure to the metal seal ring which has a reduued and extending through the slot opening to contact the surface of the valve for forming the control region. High pressure gas is applied to one side of the elastomer seal to insure that a good seal is had between the elastomer seal and the walls of the slot and between the elastomer seal and the metal seal ring. The displacement of the O-ring, due to the high gas pressure, is transferred to the metal ring to effect an increased pressure seal, for a given chamber pressure, between the reduced sealing end of the metal ring and the top surface of the control rim.

In the embodiment disclosed, the gas pressure applied to the O-ring is obtained from the pressure chamber by way of a tortuous path formed in the chamber structure for cooling the high gas pressure from the combustion chamber before it is applied to the seal. Thus, the metal seal ring, in combination with the elastomer O-ring, effects a good metal-to-metal seal and, in addition, shields and protects the elastomer ring from the heat generated within the chamber while the pressurized gas applied to the side of the elastomer ring, necessary for sealing purposes, is taken from the combustion chamber but cooled before applied to the elastomer ring.

Brief description of the drawings

FIGURE 1 illustrates a pneumatic acoustic source in the environment in which it is to be used;

FIGURE 2 is a cross-sectional view of the acoustic source and its quick-acting valve;

FIGURE 3 is a cross-sectional view of the acoustic source showing a side view of the quick-acting valve in the pressure chamber, a fuel injection and burning system in the chamber, and a schematic illustration of the equipment employed for operating the source;

FIGURE 8 is an enlarged cross-sectional view of FIGURE 2 taken along the lines 8—8;

FIGURE 9 is an enlarged cross-sectional view of FIGURE 2 taken along the lines 9—9;

FIGURE 10 illustrates the air-inject conduit and fuel injectors and igniters viewed from the position 10—10 of FIGURE 3, showing only the outline of the exterior structure of the source and the structure of the quick-acting valve.

Operation of acoustic source

Figure 4:
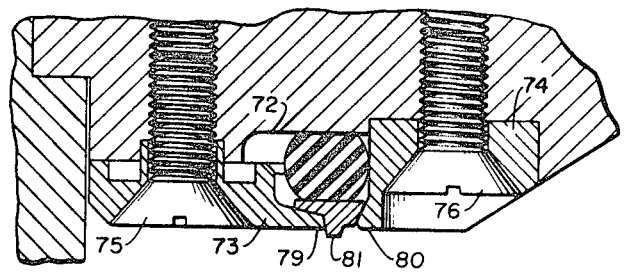
FIGURE 4 is an enlargement of a portion of the structure of FIGURE 2 showing the upper seal arrangement with the quick-acting valve of the source in an open position.
Figure 5:
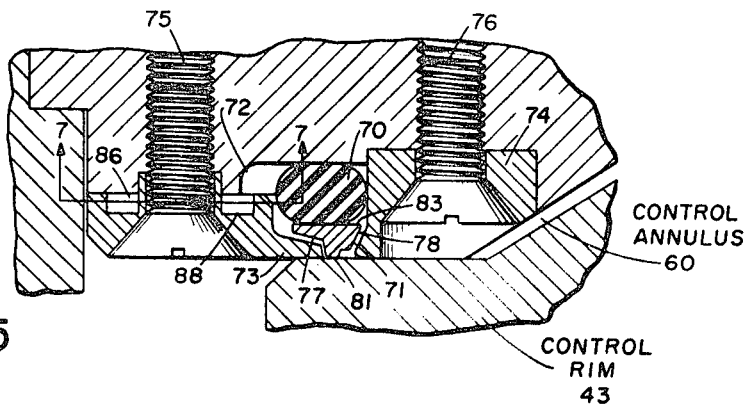
FIGURES 5 and 6 are enlargements of a portion of the structure of FIGURE 2 showing the upper seal arrangement with the quick-acting valve of the source in closed positions.

Referring now to FIGURE 1, the acoustic source 30 to which the present invention is directed is shown supported in water from a boat 31 by a cable arrangement 32 and supporting arms 33. As can be seen from the cross-sectional view of FIGURE 2, the acoustic source comprises enclosing wall structure 34 forming a pressure chamber 35 and which has an outlet port at the lower end to be coupled to water. The outlet port comprises aperture 36 formed at the lower end of enclosing wall structure 34 and a plurality of laterally extending slots 37 extending through cylinder 38. A quick-opening, spool-shaped valve 40 is provided for opening and closing the outlet port. When the valve is in a closed position, the chamber is pressurized with high gas pressure. At a desired time the valve 40 is actuated for sudden downward movement to allow the high pressure gas to escape rapidly into the water by way of the outlet port to generate an acoustic pulse.

As illustrated in FIGURES 2 and 3, the valve 40 comprises a lower release piston or rim 41 interconnecting tubular member 42, and an upper or valve control rim 43. Tubular member 42 has an upper extension 44 and an aperture 45 extending axially therethrough. The valve 40 is supported for axial movement from a closed position, as shown in FIGURE 2, to a downward open position whereby lower rim 41 is positioned near the lower end of cylinder 38. When the valve 40 is moved to a closed position, the outlet port is sealed by lower piston ring seals 46 coupled to the lower rim 41. In this position, the chamber 35 is pressurized by an arrangement including an air supply 50, solenoid controlled valve 51, conduit 52, check valve 53, and main air inlet 54. In the preferred embodiment, a plurality of diesel fuel injectors 55 is provided for injecting diesel fuel into the chamber to form a combustible mixture with the compressed air. This mixture is ignited by a plurality of igniters 56 to form hot gases of high pressure within the chamber.

In the valves' closed position, a control annulus 60 is formed between the top surface of control rim 43 and the upper chamber structure 61 of the source. Upper seal 62, coupled to the chamber structure 61, contacts the upper surface of control rim 43 to seal the annulus from the high gas pressure in the main chamber 35. Annulus 60 normally is maintained at a low pressure when the valve 40 is closed by an arrangement including normally closed solenoid valves 64 and shuttle valves 65, which vent annulus 60 to the water by way of passageways 66, valves 65, and vents 67. The area of the control rim 43 within the upper seal 62 is greater than the area of release rim 41 within the lower seal 46. Thus, a net upward force is applied to the quick-opening valve maintaining it in a closed position as the chamber 35 is pressurized.

The fact-acting valve 40 is actuated to release the pressurized gas from the chamber by increasing the pressure in control annulus 60. This is done by simultaneously opening solenoid valves 64 of a dual triggering system, to allow air to flow from conduit 52 to valves 65 by way of conduits 68, valves 64, check valves 69, and passageways 69a. The air causes shuttle valves 65 to close vents 67 for flow to annulus 60 through passageways 66. The increase in pressure in annulus 60 causes valve 40 to move downward to a position where the top surface of the control rim 43 disengages the upper seal 62. When this occurs, the high gas pressure in the chamber 35 acts upon the top surface of the control rim 43 to upset the balance of force and rapidly move the quick-opening valve 40 downwardly to allow the high gas pressure in the chamber 35 to be released immediately into the water by way of apertures 36 and slots 37 to generate an acoustic pulse.

Detailed description of the invention

Referring now to FIGURES 4–7, there will be described in detail the upper seal 62 to which the present invention is directed. This seal comprises an elastic O-ring 70 of rubberlike material and a metal ring 71, both of which are located within an annular slot 72. Slot 72 is formed by two metal holding rings 73 and 74, clamped to the upper structure 61 of the chamber by way of bolts 75 and 76. When the quick-acting valve 40 is moved to an open position (FIGURE 4) O-ring 70 biases metal ring 71 downward to a position whereby slanting surfaces 77 and 78 (see FIGURE 5) of ring 71 snugly contact matching surfaces formed on metal holding rings 73 and 74, respectively, thereby closing the slot 72. In this condition the O-ring 70 is protected from hot temperatures within the chamber and particularly from the hot gases flowing past the seal into the lower pressure control annulus 60 when the valve 40 is actuated and initially moved away from and out of engagement with the seal. In addition, since surfaces 77 and 78 snugly fit against matching surfaces on holding rings 73 and 74, the metal seal ring 71, as well as O-ring 70, is prevented from being blown out or ejected from slot 72.

When the valve 40 is moved to a closed position, surface 80 of holding ring 74, which extends about .002 to .004 of an inch beyond surface 79 of holding ring 73 (although not shown) prevents further upward movement of the valve. In addition, surface 81 of the protruding end of metal ring 71 is contacted by the top surface of control rim 43 whereby ring 71 is pushed upward against the pressure of the O-ring 70. Thus, metal ring 71 rather than O-ring 70 contacts the hot surface of control rim 43 and, in cooperation with overlapping rim 43 and metal holding rings 73 and 74, shields and protects the O-ring 70 from the high temperature gases generated within the chamber 35.

Figure 6:
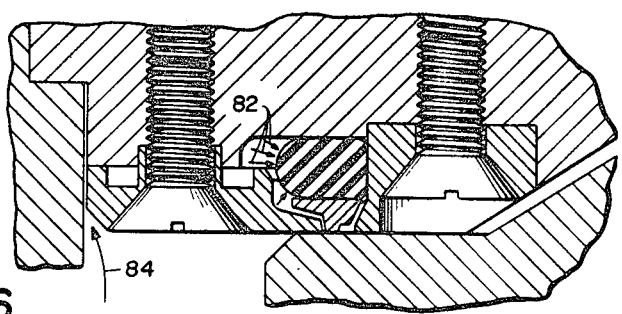

In addition, when the valve 40 is in a closed position and the chamber 35 pressurized, high gas pressure is applied to the exterior side of O-ring 70 in the direction of the arrows 82 (see FIGURE 6). This allows a good seal to be obtained between the O-ring 70 and the upper chamber structure 61 as well as between the O-ring and the wall surface formed by holding ring 74. The displacement of the O-ring 70, due to the gas pressure acting on its side, is transferred to the metal ring 71. Thus, a good seal also is obtained between O-ring 70 and the top surface 83 of metal ring 71. In addition, since the bottom surface 81 of the lower reduced end of metal ring 71 is much smaller than the top surface 83, an increased pressure seal is obtained between the bottom surface 81 of ring 71 and the top surface of control rim 43 for a given pressure within the chamber 35.

Figure 7:
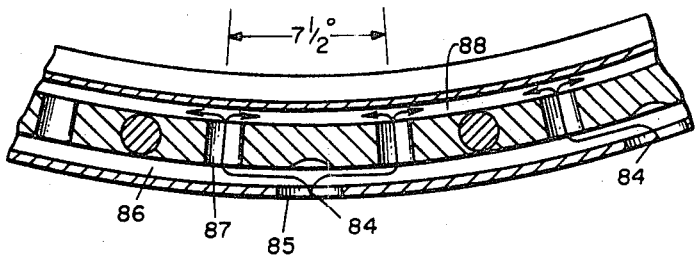
FIGURE 7 is a reduced cross section of FIGURE 5 taken along the lines 7—7 with the elastomer seal removed.

The pressurized gas applied to the exterior side of O-ring 70 for sealing purposes is taken from chamber 35; however, it is applied to the slot 72 by way of tortuous cooling paths illustrated at 84. As can be seen in FIGURE 7, these paths extend through a labyrinth formed by slots 85, channel 86, slot 87, and channel 88, the latter of which is open to sealing ring slot 72. The structure forming the slots and channels acts as a heat sink. Thus, the gas in following the various paths to the slot 72 is cooled to a temperature which has little effect on the O-ring.

In summary, the combination of the rubberlike O-ring 70 and the metal ring 71 plus the sealing gas pressure applied to the O-ring 70 provided a very effective seal. Even though the gas temperature within the chamber 35 reaches about 1700° F. or above, the O-ring 70 is adequately protected by the metal ring 71 and the tortuous paths mentioned above and a significantly longer lifetime of the O-ring has been obtained. Moreover, the O-ring 70 and the sealing gas pressure applied thereto compensate for wear of the bottom surface 81 of metal ring 71, thereby increasing the effective lifetime of metal ring 71.

In the embodiment disclosed, slots 85, channel 86, slots 87, and channel 88 are formed in holding ring 73. Although not shown, there are provided twenty-four equally spaced slots 85 and forty-eight equally spaced slots 87. Slots 85 are about one-half inch wide while slots 87 are about one-fourth inch wide. The angle between the centers of adjacent slots 87 is of the order of 7½ degrees while the angle between the centers of adjacent slots 85 is of the order of 15 degrees. The interior diameters of channels 86 and 88 are of the order of 19.683 and 18.800 inches, respectively. These channels each are about one-eighth inch wide. Metal holding ring 73 is of the type 316 stainless steel; ring 74 of 17–4 stainless steel; and metal seal ring 71 of 304 stainless steel. The wall structure of chamber 35 is of cast type 316L stainless steel; member 61 is of 316 stainless steel; and the quick-acting valve of cast type 17–4 stainless steel. The O-ring 70 employed was manufactured by Parker Seal Company. It is a heat resistant elastomer seal identified as a No. V–361–9 or No. V–377–9 (VITON) 90 DURO which is a linear copolymer of vinylidene fluoride and hexafluoropropylene. It has an inside diameter of 18 inches and a cross-sectional diameter of one-fourth inch. The bottom sealing surface 81 of metal ring 71 has a width of the order of .020 inch. The width of the top surface 83 of metal ring 71 is of the order of .250 inch.

In operations wherein the source is fired every six seconds, the upper seal as disclosed above has worked satisfactorily without failure for over 200,000 cycles of operation of the source.

Referring again to FIGURE 2, there will be described details of the quick-acting valve structure, a valve retract mechanism, and valve deceleration systems. These features also are disclosed and claimed in copending United States patent application by Bernard Otto, Repetitive Pneumatic Acoustic Source for Marine Seismic Surveying, Serial No. 663,676, filed of even date herewith and assigned to the same assignee as the present invention. The arrangement for supporting the quick-acting valve 40 centrally of the exterior wall structure 34 and for movement axially thereof comprises a lower wear ring 90 coupled to the lower rim 41 and an upper bearing member 91 coupled to the upper chamber structure. Wear ring 90 slides on the inner surface of slotted cylinder 38 which is made up of an inner slotted liner 38a and an outer slotted cylinder 38b. Bearing 91 supports and guides the upper extension 44 of the quick-acting valve 40.

Extending centrally of the quick-acting valve 40 and supported rigidly with respect to the chamber wall structure 34 is a central member. This member comprises central support 92, tubular member 93, and slotted end cap 94 coupled together, respectively, and to the chamber wall structure 34 by way of hub 95 and slotted cylinder 38. Central support member 92 has keys 96 secured thereto by bolts 97 and which cooperate with slots 98 (see FIGURE 8) formed in the interior surface of the valve 40 for guiding the valve in its upward and downward movements.

The exterior diameters of tubular member 93 and slotted end cap 94 are smaller than the interior diameter of the aperture extending through the quick-acting valve 40, thereby providing a central annular region exposed to and containing water. Water may pass into and out of this region by way of the aperture 45 extending through the upper extension 44 of the valve 40 and by way of water slots 100 formed on the outer periphery of central support member 92. These water slots extend from the top portion of member 92 to apertures 101, the latter of which allow water to pass interiorly of member 92 intermediate its end. Thus, the central water region extends completely through the quick-acting valve 40 when it is in a closed position.

Water within the central region contacts the interior surface of the tubular interconnecting member 42 of the quick-acting valve thereby cooling this member from the hot temperatures generated within the pressure chamber 35. The lower rim 41 also is cooled by direct contact with the water. In order to avoid undue stresses on the valve 40 due to uneven temperatures, the upper rim 43 is cooled by air. As can be seen in FIGURE 3, the air inlet 54, used to inject air to form the combustible mixture, extends into the chamber 35 and has a curved end 54A pointing toward the position of the upper rim 43. during the air injection cycle, relatively cool air (of the order of 100°–150° F.) is directed onto the upper rim for cooling purposes and also to form the combustible mixture for ignition.

Also located within the aperture 45 extending through the quick-acting value 40 is a retract mechanism comprising an air chamber 102 formed by the tubular member 93 and in addition interior retract piston 103, the latter of which is rigidly coupled to the quick-acting valve 40. This coupling is by way of stem 104, rim 105, a plurality of spaced spokes 106, and rim 107. Thus, the retract piston 103 moves with the quick-acting valve 40 and is supported for sliding movement within the rigidly supported member 93. The lower end of tubular member 93 is closed by end portion 108. Pressurized air is injected into the retract chamber 102 by way of flexible conduit 109 and aperture 110 extending through stem 104. Thus, following the generation of an acoustic pulse and after the high gas pressure is released from the pressure chamber 35, the pressurized air in the retract chamber acts over the entire surface 111 of retract piston 103 and moves the piston 103 and hence the quick-acting valve 40 to the closed position.

The arrangement for decelerating the valve comprises a lower water trap region or chamber 116 for decelerating the quick-acting valve 40 at the end of its opening movement and an upper or return water trap arrangement 117 for decelerating the quick-opening valve 40 at the end of its return movement.

Lower water trap region 116 is formed as the lower rim portion 118 slides around the enlarged cylindrical portion 119 of central support 92. Water trapped in this region decelerates the valve 40. It escapes downward through the small clearance between the exterior surface of member 119 and the interior surface of member 118. The exterior surface of member 119 is tapered toward its upper end to provide a variable orifice to obtain uniform deceleration of the valve 40. Upon movement of the valve 40 downward, water below the lower rim 41 passes outward and downward by way of slots 37 and apertures 121 formed in connecting hub 95.

As the quick-acting valve 40 and hence the retract piston 103 moves downwardly, water from the annular water region within the quick-acting valve 40 flows through laterally extending apertures 122, formed in end cap 94, into the chamber region 117. Upon upward movement of the valve 40 and the retract piston 103, water trapped within this region decelerates the valve at the end of its return movement. It escapes through apertures 122 by way of the small clearance between the exterior surface of retract piston 103 and the interior surface of end cap 94. The exterior surface of retract piston 103 is tapered toward its upper end to provide a variable orifice to obtain uniform deceleration of the valve.

Referring now to FIGURES 1, 2, 3, and 10, there will be described the fuel injection and ignition system for pressurizing the main chamber 35. Four fuel injectors 55 and four electric igniters 56 are alternately spaced and located at the top of the source. Similarly, four fuel injectors 55 and four electric igniters 56 are located alternately at the bottom of the source. The fuel injectors are fed with diesel fuel by an exterior manifold 130 and conduits 131 clamped to the source by means not shown. Power is supplied to the igniters by way of conduits 132 extending from the igniters to a junction box 133 to which electrical conduits (not shown) extend from the boat 31.

The fuel injectors 55 and igniters 56 are located at positions whereby diesel fuel from each fuel injector 55 is sprayed toward an associated igniter. In the embodiment disclosed, the four upper fuel injectors 55 spray fuel toward four lower igniters 56, respectively, and the four lower fuel injectors 55 spray fuel toward the four upper igniters 56, respectively. In FIGURES 3 and 10, the upward traveling fuel is indicated by the dotted lines 136 while the downward traveling fuel is indicated by the dashed lines 137. Each associated fuel injector-igniter pair is positioned whereby the direct line of sight between each pair is offset from the center of the chamber 35 whereby the tubular interconnecting member 42 does not interfere with the diesel fuel sprayed toward the igniters.

The main air inlet 54 is positioned to direct air into the pressure chamber 35 upward toward the bottom surface of control rim 43 of the quick-acting valve 40 at one side of the tubular interconnecting member 42. Upon striking the bottom surface of the control rim 43, the air is deflected around the chamber in a clockwise direction and downwardly in a swirling motion. The general direction of air flow is indicated in FIGURE 10 by curved arrow 138.

The fuel injectors 55 and igniters 56 are located whereby fuel is sprayed from an injector toward an associated igniter in a direction opposite the flow of clockwise air between the injector-igniter pairs in order to enhance mixing of diesel fuel with the air. In addition, each igniter 56 has a shield 139 located at one side thereof between the igniter and the air flowing toward the igniter in the clockwise direction. These shields are provided to shield or protect the igniters from the cooled air injected into the chamber. Since the air is injected in one direction and fuel is injected into the other direction, the shields do not interfere with the fuel sprayed toward each igniter but do prevent the cooler air from cooling the igniters thereby avoiding erratic firing of the source. This combination is disclosed and claimed in copending United States patent application by George B. Loper, Fuel Mixing and Ignition System in Pneumatic Acoustic Source, Serial No. 663,663, filed of even date herewith and assigned to the same assignee as the present invention.

Figure 11:
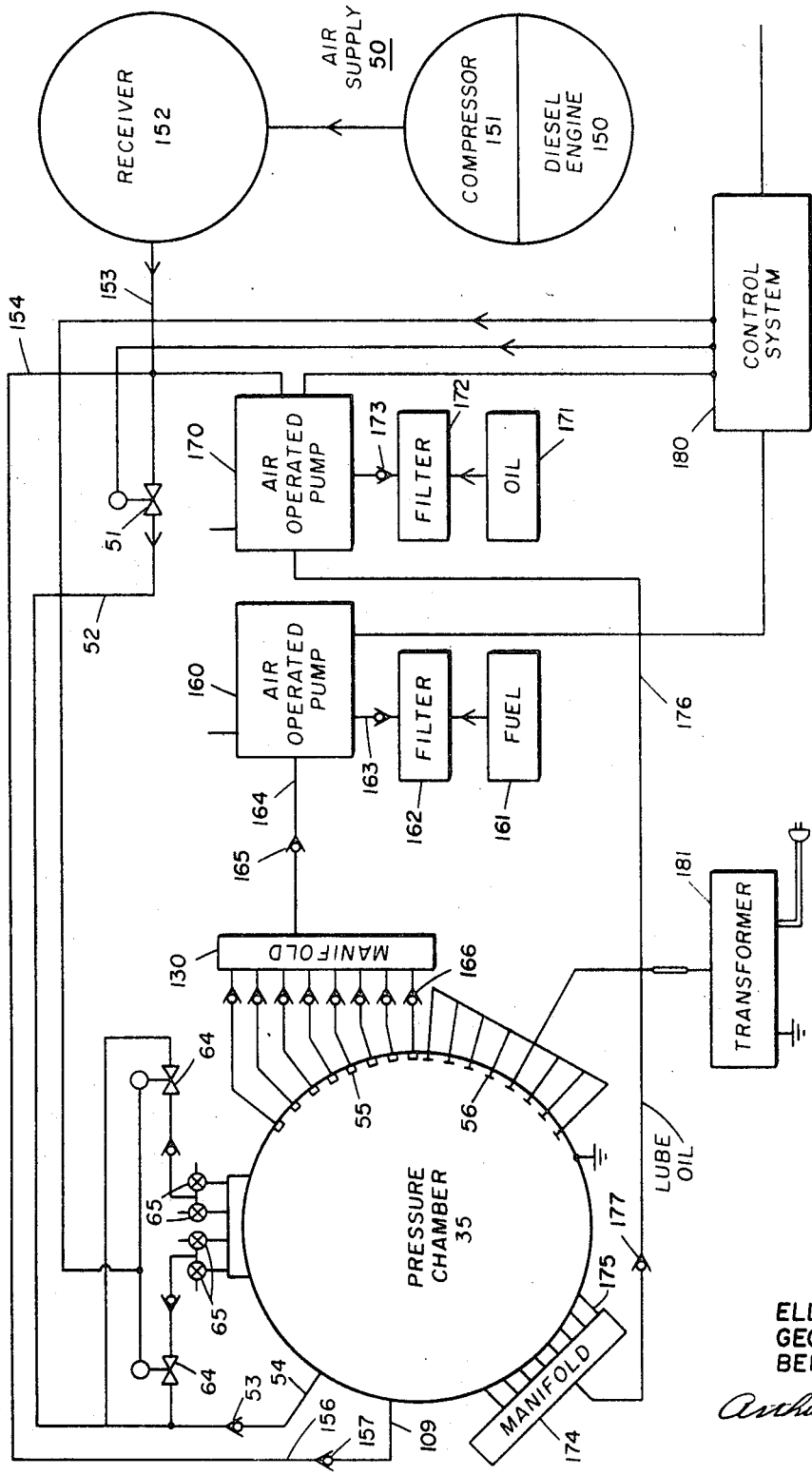
FIGURE 11 is a schematic diagram of the acoustic source and instrumentation used to control the source.

Referring now to FIGURE 11, a brief description will be given in the manner that the source and associated equipment operate to produce periodic pulses of acoustic energy in water. The air supply 50 comprises a diesel engine 150, a compressor 151, and a receiver 152. The output of this receiver is coupled to the source by way of conduit 153, solenoid controlled valve 51, and conduit 52. Air for retracting the quick-acting valve is continuously applied to the air retract chamber 102 by way of conduit 154, check valve 157, and flexible conduit 109. The arrangement for applying diesel fuel to the source comprises an air-operated pump 160 coupled to a fuel supply 161 by way of filter 162 and check valve 163. Pump 160 applies fuel to manifold 130 by way of conduit 164 and check valve 165. Check valves 166 are provided between the manifold 130 and the diesel fuel injectors 55. An arrangement also is provided for applying lubricating oil to the lower piston of the quick-acting valve. This arrangement comprises a second air-operated pump 170 coupled to an oil supply 171 by way of filter 172 and check valve 173. Pump 170 applies lubricating oil to a lubricating oil manifold 174 (see also FIGURES 1 and 2) and conduits 175 by way of conduit 176 and check valve 177.

An electrically operated control system 180 sequentially controls solenoid actuated valves 51 and 64 and in addition air-operated pumps 160 and 170 during each cycle of operation for the production of an acoustic pulse. For example, assuming that the quick-acting valve 40 is in a closed position, control system 180 applies a signal to valve 51 to open this valve for a short period of time to allow high pressure air from receiver 152 to be applied into the pressure chamber 35. During the air filling operation, control system 180 also operates air-operated pump 170 to pump lubricating oil into the chamber for a short period of time. Pump 170 then is inactivated and valve 51 cut off after the chamber 35 has been filled with air. Next, control system 180 actuates pump 160 to inject diesel fuel into the pressure chamber for a short period of time. Igniters 56 are continuously energized by power applied thereto from transformer 181. Thus, as soon as diesel fuel is injected into the chamber to form the combustible mixture, ignition starts and continues until a predetermined time (when the pressure no longer rises) when control system 180 actuates solenoid operated valves 64 for a short period of time to allow air in conduit 52 to be applied to control annulus 60 to actuate the quick-acting valve 40 for releasing the high pressure gas from the pressure chamber 35 into the water to generate an acoustic pulse. After the high pressure gas is released into the water, the pressurized air applied to retract chamber 102 retracts the valve 40 to its closed position and the cycle is repeated.

In the preferred embodiment, the source is operated to produce acoustic pulses every six seconds. The pressure chamber 35 has a volume of 9 cubic feet. Air supply 50 has a capacity to pressurize chamber 35 up to about 75 or 90 p.s.i. gauge during the air filling cycle. Burning of the combustible mixture increases the pressure within the chamber, in one embodiment, to 500 p.s.i. gauge. The burning period, from the time that diesel fuel is injected until the valve 40 is triggered for opening, is of the order of .7–1.0 second. After the source has been triggered and the control rim 43 of the valve 40 moved out of engagement with the top upper seal 52, the time required for the valve 40 to move to an open position was of the order of 10 milliseconds. During this time period, the quick-opening valve experiences a force sufficient to produce accelerations up to about 300–600 G's. The valve itself weighs about 300 pounds while the source 30, including the valve but without the supporting arms, weighs about 1800 pounds in air.

The shuttle valves 65 mentioned above are disclosed and claimed in the aforementioned application by Bernard Otto. Each valve comprises a tubular member having two open ends and a closed wall formed intermediate the ends blocking the passageway through the tubular member. The valve is supported for reciprocal movement in a conduit whose two ends are connected to passageway 69a and vent 67, respectively. Passageway 66 is connected to the conduit intermediate its ends. Apertures extend laterally through the side structure of the tubular member on each side of the wall but spaced therefrom. Normally a spring biases the tubular member to a position whereby the apertures on the side of the wall facing vent 67 are positioned over the passageway 66 thereby connecting passageway 66 and hence annulus 60 to vent 67. In this position, the wall also blocks passageway 69a from passageway 66. When valves 64 are actuated, air flows through passageway 69a and acts on the other side of the wall to move the shuttle valve toward the vent 67 to position the apertures on this latter side of the wall over passageway 66 to allow air to flow to annulus 60 for triggering purposes. In this latter position the wall in the shuttle valve blocks vent 67 from passageway 66.

Although the preferred embodiment discloses the use of fuel injectors and igniters to pressurize the chamber 35, it is to be understood that pressurized air only may be used in the source. In this event, the fuel injectors 55 and igniters 56, including their associated equipment, may be omitted. The remaining equipment including the air supply 50 for injecting compressed air into the chamber 35, the dual triggering system, the valve retract system, and the lubricating oil injectors, including their associated equipment, is retained. The cycle of operation would remain the same except for the injection of diesel fuel into the chamber 35 and burning of the combustible mixture. In this modification, the arrangement of the upper seal 62 remains the same and functions to provide a durable and effective seal for sealing the control annulus 60.

What is claimed is:

1. In an acoustic source for generating acoustic pulses in water for exploratory purposes including:
   a pressure chamber to be immersed in water and having a first end and an outlet port means spaced from said first end,
   valve means including a release member supported for movement in a first direction away from said first end to an open position for opening said outlet port means and in an opposite direction toward said first end to a closed position for closing said outlet port means,
   means utilized for moving said valve means in said opposite direction to a closed position,
   means for introducing a combustible fluid in said chamber,
   means for igniting said combustible fluid to form hot gases of high pressure in said chamber,
   wall structure having a pressure retaining portion,
   said valve means having a surface facing said wall structure and movable toward and away from said wall structure upon movement of said valve means in said opposite and said first directions, respectively,
   the improvement which comprises:
      a slot formed in said wall structure surrounding said pressure retatining portion,
      said slot including an opening and a region extending into said wall structure,
      the width of said opening of said slot being smaller than the width of said region of said slot extending into said wall structure,
      movable seal means surrounding said pressure retaining portion and positioned to be compressed in one of said directions upon movement of said valve means in said opposite direction to said closed position to provide a pressure seal between said surface and said pressure retaining portion forming a control region normally maintained at a pressure lower than said pressure in said chamber,
      said movable seal means including an elastomer member and a metal member,
      said metal member in cross section having an enlarged body portion located in said slot and a reduced end portion, the latter of which is supported for extension through said opening to contact said surface of said valve for forming said pressure seal when said valve is in a closed position,
      said elastomer member being located in said slot between said metal member and the wall structure of said slot and in contact with said enlarged portion of said metal member and said wall structure of said slot for biasing said metal member in a direction to close said opening with said metal member to protect said elastomer member from the heat generated within said chamber when said valve is moved to an open position, and
      means for increasing the pressure within said control region to move said valve means to a position to disengage said seal means and allow said high gas pressure in said chamber to move said valve means to said open position for releasing said high gas pressure rapidly from said chamber to generate an acoustic pulse in water.

2. In an acoustic source for generating acoustic pulses in water for exploratory purposes including:
   a pressure chamber to be immersed in water and having a first end and an outlet port means spaced from said first end,
   valve means including a release member supported for movement in a first direction away from said first end to an open position for opening said outlet port means and in an opposite direction toward said first end to a closed position for closing said outlet port means,
   means utilized for moving said valve means in said opposite direction to a closed position,
   means for introducing a fluid in said chamber when said valve means is in a closed position to form a high gas pressure therein,
   wall structure having a pressure retaining portion,
   said valve means having a surface facing said wall srtucture and movable toward and away from said wall structure upon movement of said valve means in said opposite and said first directions, respectively,
   the improvement which comprises:
      a slot formed in said wall structure surrounding said pressure retaining portion,
      said slot including an opening and a region extending into said wall structure,
      movable seal means surrounding said pressure retaining portion and poitioned to be compressed in one of said directions upon movement of said valve means in said opposite direction to said closed position to provide a pressure seal between said surface and said pressure retaining portion forming a control region normally maintained at a pressure lower than said pressure in said chamber,
      said movable seal means including a rubberlike member and a metal member,
      said metal member having a first portion located in said slot and an end portion supported for extension through said opening to contact said surface of said valve for forming said seal,
      said rubberlike member being located within said slot between said metal member and the wall of said slot and in contact with said metal member and said wall of said slot,
      channel means extending through said wall structure from said chamber to said slot to allow high gas pressure within said chamber to be applied to said rubberlike member to form a seal between said rubberlike member and said wall of said slot and to bias said metal member in a direction toward said surface of said valve means to obtain a pressure-tight seal between said end portion of said metal member and said surface of said valve means when said valve means is in a closed position, and
      means for increasing the pressure within said control region to move said valve means to a position to disengage said seal means and allow said high gas pressure in said chamber to move said valve means to said open position for releasing said high gas pressure rapidly from said chamber to generate an acoustic pulse in water.

3. The acoustic source of claim 2 wherein:
   said rubberlike member is an elastomer member,
   said means for introducing fluid in said chamber includes means for introducing a combustible fluid therein,
   means for igniting said combustible fluid to form hot gases of high pressure in said chamber,
   said channel means including tortuous cooling paths extending through said wall structure from said chamber to said slot to allow high gas pressure within said chamber applied to said elastomer member to be cooled to protect said elastomer member from high temperature gases.

4. The acoustic source of claim 2 wherein:

the width of the opening of said slot is smaller than the width of the region of said slot extending into said wall structure, said metal member being ring shaped and the cross section thereof having an enlarged body portion and a reduced end portion, said enlarged body portion having a contact surface located within said slot, said reduced end portion having a sealing surface of a width smaller than that of said contact surface and substantially parallel with said contact surface, said metal member being positioned adjacent said opening, said rubberlike member being ring shaped and located in said slot between said metal member and said wall of said slot and in contact with said contact surface of said metal member and said wall of said slot, said reduced end of said metal member being supported to extend through said opening for contact of said sealing surface with said surface of said valve means for forming said seal, said high pressure gas applied from said chamber to said side of said rubberlike member forming a seal between said ruberlike member and said wall of said slot and biasing said metal member outward from said slot toward said surface of said valve to obtain an increased pressure seal, for a given pressure in said chamber, between said sealing surface of said reduced end of said metal member and said surface of said valve means.

5. The source of claim 4 wherein:

said rubberlike member is an elastomer member, said means for introducing fluid in said chamber includes means for introducing a combustible fluid therein, means for igniting said combustible fluid to form hot gases of high pressure in said chamber, said channel means including tortuous cooling paths extending through said wall structure from said chamber to said slot to allow high gas pressure within said chamber and applied to said elastomer member to be cooled to protect said elastomer member from high temperature gases.

6. The acoustic source of claim 5 wherein:

said metal member, between said enlarged portion and said reduced end portion, has surfaces which match surfaces formed on said wall of said slot adjacent said opening and which snugly contact each other when said metal member is moved in a direction toward said opening by said elastomer member when said valve is moved to an open position thereby sealing said slot from the high gas temperature within said chamber for protecting said elastomer member.

7. In an acoustic source for generating acoustic pulses in water for exploratory purposes including:

a pressure chamber to be immersed in water and having a first end and an outlet port means spaced from said first end, valve means including a release member supported for movement in a first direction away from said first end to an open position for opening said outlet port means and in an opposite direction toward said first end to a closed position for closing said outlet port means, means utilized for moving said valve means in said opposite direction to a closed position, means for introducing a fluid in said chamber when said valve means is in a closed position to form a high gas pressure therein, structure for supporting seal means, said valve means having a surface facing said structure and movable toward and away from said structure upon movement of said valve means in said opposite and said first direction, respectively, the improvement which comprises:

a ring-shaped slot formed in said structure, said slot including an opening and a region extending into said structure, movable seal means positioned to be compressed in one of said directions upon movement of said valve means in said opposite direction to a closed position to provide a pressure seal between said surface and said structure, said movable seal means including a rubberlike member and a metal member, said metal member having a first portion located in said slot and an end portion supported for extension through the opening of said slot to contact said surface of said valve means for forming said pressure seal when said valve means is in a closed position, said rubberlike member being located within said slot between said metal member and the wall of said slot and in contact with said metal member and said wall of said slot, channel means extending through said structure from said chamber to said slot to allow high gas pressure within said chamber to be applied to said rubberlike member to form a seal between said rubberlike member and said wall of said slot and to bias said metal member in a direction toward said surface of said valve means to obtain a pressure-tight seal between said end portion of said metal member and said surface of said valve means when said valve means is in a closed position, and means for controlling said valve means for movement of said valve means to a position to disengage said seal means and allow high gas pressure in said chamber to move said valve means to said open position for releasing said high gas pressure rapidly from said chamber to generate an acoustic pulse in water.

8. The source of claim 7 wherein:

the opening of said slot faces said surfaces of said valve means, the width of the opening of said slot being smaller than the width of the region of said slot extending into said structure, said metal member, in cross section, having an enlaregd body portion and a reduced end portion, said enlarged body portion being located in said slot and said reduced end portion being supported to extend through said opening to contact said surface of said valve means for forming said pressure seal when said valve means is in a closed position.

9. The source of claim 8 wherein:

said rubberlike member is an elastomer member.

10. The source of claim 9 wherein:

said means for introducing fluid in said chamber includes means for introducing a combustible fluid therein, means for igniting said combustible fluid to form hot gases of high pressure in said chamber, said channel means including tortuous cooling paths extending through said structure from said chamber to said slot to allow high gas pressure within said chamber to be applied to said elastomer member to be cooled to protect said elastomer member from high temperature gases.

11. In an acoustic source for generating a acoustic pulses in water for exploratory purposes including:

a pressure chamber to be immersed in water and having a first end and an outlet port means spaced from said first end, valve means including a release member supported for movement in a first direction away from said first end to an open position for opening said outlet port means and in an opposite direction toward said first end to a closed position for closing said outlet port means, means utilized for moving said valve means in said opposite direction to a closed position, means for introducing a fluid in said chamber when said valve means is in a closed position to form a high gas pressure therein, wall structure having a pressure retaining portion, said valve means having a surface facing said wall structure and movable toward and away from said wall structure upon movement of said valve means in said opposite and said first directions, respectively, the improvement which comprises:

a slot formed in said wall structure surrounding said pressure retaining portion, said slot including an opening and a region extending into said wall structure, the width of said opening of said slot being smaller than the width of said region of said slot extending into said wall structure, said opening of said slot facing said surface of said valve means, seal means surrounding said pressure retaining portion for providing a pressure seal between said surface and said pressure retaining portion when said valve means is moved to said closed position to form a control region normally maintained at a pressure lower than said pressure in said chamber, said seal means including a rubberlike material and a metal member, said metal member, in cross section, having an enlarged body portion located in said slot and a reduced end portion, the latter of which is supported for extension through said opening to engage said surface of said valve for forming said pressure seal when said valve is in a closed position, said rubberlike member being located in said slot between said metal member and the wall structure of said slot and in contact with said enlarged portion of said metal member and said wall structure of said slot, and means for increasing the pressure within said control region to move said valve means to a position to disengage said reduced end portion of said metal member and allow said high gas pressure in said chamber to move said valve means to said open position for releasing said high gas pressure rapidly from said chamber to generate an acoustic pulse in water.

12. In an acoustic source for generating acoustic pulses in water for exploratory purposes including:

a pressure chamber to be immersed in water and having a first end and an outlet port means spaced from said first end, valve means supported for movement in a first direction away from said first end to an open position for opening said outlet port means and in an opposite direction toward said first end to a closed position for closing said outlet port means, means utilized for moving said valve means in said opposite direction to a closed position, means for introducing a fluid in said chamber when said valve means is in a closed position to form a high gas pressure therein, means for controlling said valve means to allow said high gas pressure in said chamber to move said valve means rapidly to said open position for releasing said high gas pressure rapidly from said chamber to generate an acoustic pulse in water, and structure for supporting seal means, said valve means having a surface facing said structure and movable toward and away from said structure upon movement of said valve means in said opposite and said first directions, respectively, the combination therewith of improved seal means for forming a pressure seal between said structure and said surface of said valve means when said valve means is moved to said closed position, comprising:

a slot formed in said structure, said slot including an opening and a region extending into said structure, the width of said opening of said slot being smaller than the width of said region of said slot extending into said structure, said opening of said slot facing said surface of said valve means, and sealing members including a rubberlike member and a metal member, said metal member, in cross section, having an enlarged body portion and a reduced end portion, said enlarged body portion being located in said slot and said reduced end portion being supported to extend through said opening to contact said surface of said valve means when said valve means is in said closed position, said rubberlike member being located within said slot between said metal member and the wall of said slot and in contact with said metal member and said wall of said slot.

13. The combination of claim 12 comprising:

channel means extending through said structure from said chamber to said slot to allow high gas pressure within said chamber to be applied to said rubberlike member to form a seal between said rubberlike member and said wall of said slot and to bias said metal member in a direction toward said surface of said valve means to obtain a pressure-tight seal between said end portion of said metal member and said surface of said valve means when said valve means is in a closed position.

References Cited

UNITED STATES PATENTS 3,269,737 8/1966 Freese _____ 92—165 X
3,379,273 4/1968 Chelminski.

BENJAMIN A. BORCHELT, Primary Examiner

GERALD H. GLANZMAN, Assistant Examiner